United States Patent
Bottazzi et al.

(10) Patent No.: US 9,898,633 B2
(45) Date of Patent: Feb. 20, 2018

(54) METHOD AND SYSTEM FOR DETERMINING THE POSITION AND MOVEMENT OF ITEMS USING RADIO FREQUENCY DATA

(71) Applicant: Datalogic IP Tech, S.r.l., Lippo di Calderara (IT)

(72) Inventors: Marco Bottazzi, Ferrara (IT); Enrico Savioli, Alfonsine (IT); Federico Natali, Bologna (IT)

(73) Assignee: DATALOGIC IP TECH, S.R.L., Lippo di Calderara di Reno (Bologna) (IT)

( * ) Notice: Subject to any disclaimer, the term of this patent is extended or adjusted under 35 U.S.C. 154(b) by 0 days.

(21) Appl. No.: 14/700,016

(22) Filed: Apr. 29, 2015

(65) Prior Publication Data

US 2016/0321481 A1     Nov. 3, 2016

(51) Int. Cl.
*G06K 7/10*     (2006.01)
*G06K 7/00*     (2006.01)
*G06K 17/00*     (2006.01)

(52) U.S. Cl.
CPC ....... *G06K 7/10435* (2013.01); *G06K 7/0008* (2013.01); *G06K 7/10* (2013.01); *G06K 17/00* (2013.01)

(58) Field of Classification Search
CPC ......... G06K 7/0008; G06K 9/26; G06K 9/325
USPC ........................................................ 340/10.1
See application file for complete search history.

(56) References Cited

U.S. PATENT DOCUMENTS

| | | | |
|---|---|---|---|
| 4,575,623 | A | 3/1986 | Cononi et al. |
| 4,676,343 | A | 6/1987 | Humble et al. |
| 4,939,355 | A | 7/1990 | Rando et al. |
| 5,491,328 | A | 2/1996 | Rando |
| 5,679,941 | A | 10/1997 | Iizaka et al. |
| 5,723,852 | A | 3/1998 | Rando et al. |
| 5,869,827 | A | 2/1999 | Rando |

(Continued)

FOREIGN PATENT DOCUMENTS

| | | |
|---|---|---|
| EP | 2 131 304 A1 | 12/2009 |
| EP | 2533173 B1 | 4/2014 |

(Continued)

OTHER PUBLICATIONS

*Supermarket News*, "Kroger Store Deploys 'Tunnel Scanner' at Checkout," http://supermarketnews.com/latest-news/kroger-store-displays-tunnel-scanner-checkout, Jul. 21, 2010.

(Continued)

*Primary Examiner* — Vernal Brown
(74) *Attorney, Agent, or Firm* — Stoel Rives LLP

(57) ABSTRACT

A data reading system, and associated methods of operation, for locating and tracking a position of tagged items on a conveyor system. The system includes a data reader and a conveyor system operable to transport the tagged items through a read region of the data reader. A processor, in operative communication with the data reader, obtains data from an item tag being passed through the read region at a first time, at a second time, at a subsequent third time, and so forth. Based on the readings, the processor estimates an initial position of each item tag and determines an order at which each item reaches a reference position on the conveyor system.

20 Claims, 7 Drawing Sheets

(56) References Cited

U.S. PATENT DOCUMENTS

| | | | |
|---|---|---|---|
| 5,978,772 | A | 11/1999 | Mold |
| 6,189,784 | B1 | 2/2001 | Williams |
| 6,223,986 | B1 | 5/2001 | Bobba et al. |
| 6,301,545 | B1* | 10/2001 | Brodie .............. G01C 21/005 342/352 |
| 6,446,870 | B1 | 9/2002 | Rando |
| 6,967,579 | B1* | 11/2005 | Elizondo .............. B64F 1/368 340/572.1 |
| 7,298,264 | B1 | 11/2007 | Kuzma |
| 7,337,960 | B2 | 3/2008 | Ostrowski et al. |
| 8,746,564 | B2 | 6/2014 | Olmstead et al. |
| 2006/0001585 | A1* | 1/2006 | Saito .............. G01S 3/14 343/754 |
| 2009/0051494 | A1* | 2/2009 | Song .............. G06K 7/0008 340/10.1 |
| 2009/0134221 | A1 | 5/2009 | Zhu et al. |
| 2010/0145504 | A1 | 6/2010 | Redford et al. |
| 2010/0217678 | A1 | 8/2010 | Goncalves |
| 2012/0187195 | A1 | 7/2012 | Svetal et al. |

FOREIGN PATENT DOCUMENTS

| | | |
|---|---|---|
| JP | 05-307635 A | 11/1993 |
| WO | WO 2010/015266 A1 | 2/2010 |

OTHER PUBLICATIONS cincysavers.com, "Behold, I Have Seen the Future." cincysavers.com/... /advantage-checkout, Apr. 9, 2010.

Baverman, "Kroger's Fast Scanner a Retail Winner." http://news.cincinnati.com/article/20110111/BIZ01/101120344/Kroger-s-fast-scanner-retail-winner, Jan. 11, 2011.

SCDigest, "High Speed UPC Scan Tunnel at Heart of New Advantage Checkout System; Reducing Billions of Touches Annually; Bearish Bet on RFID in Grocery; What Will Kroger Do?." http://www.scdigest.com/ontarget/11-01-11-2.php?cid=4083&ctype=content, Jan. 11, 2011.

International Search Report, PCT/US2012/022449, dated Aug. 9, 2012.

International Searching Authority, International Search Report and Written Opinion, PCT/IB2016/052409, dated Aug. 3, 2016, 12 pp.

* cited by examiner

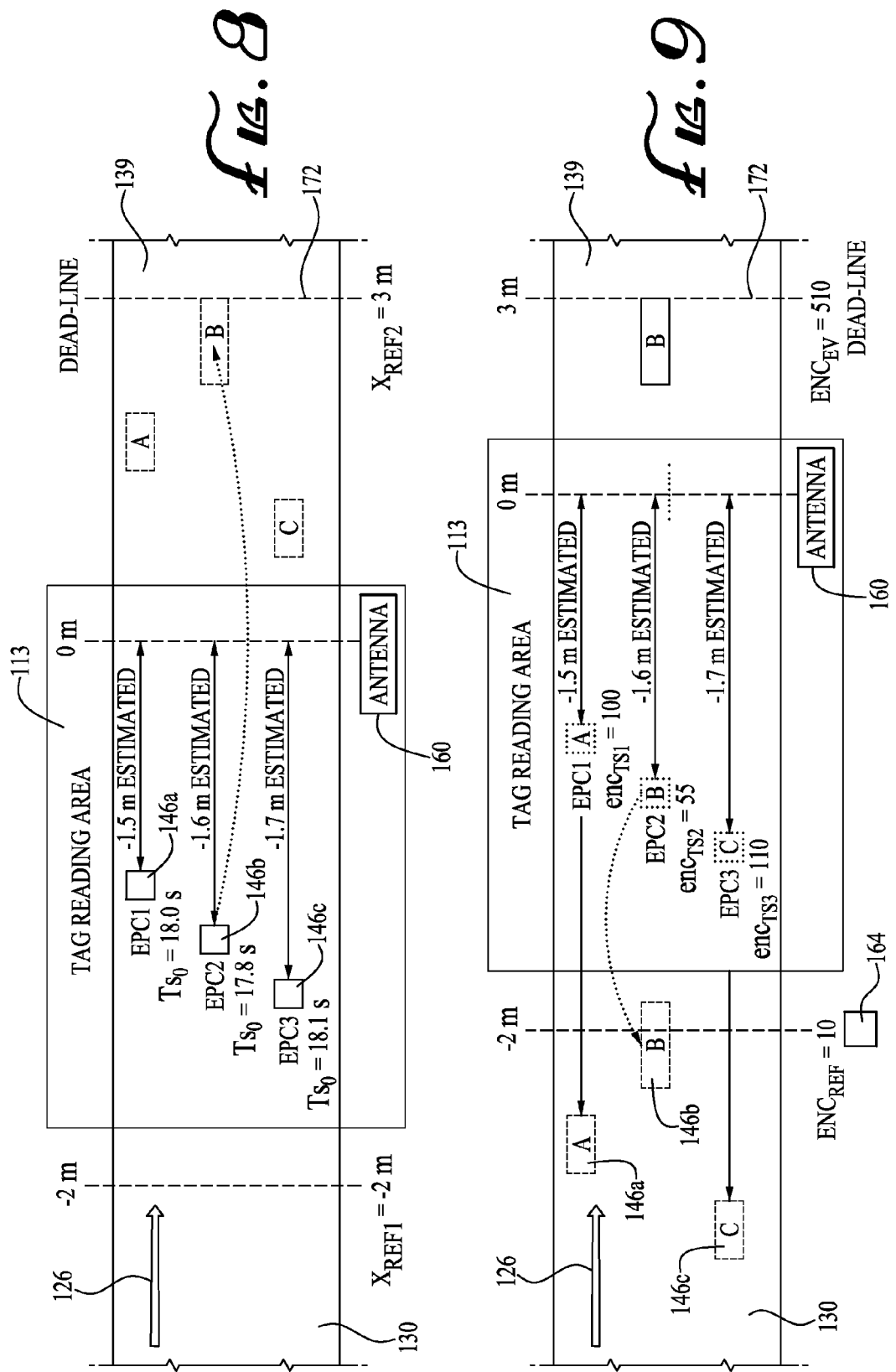

METHOD AND SYSTEM FOR DETERMINING THE POSITION AND MOVEMENT OF ITEMS USING RADIO FREQUENCY DATA

BACKGROUND

The field of the present disclosure relates generally to systems and methods for item checkout and in certain aspects to retail or other checkout stands (e.g., a parcel distribution station) that incorporate data readers and other electronic devices. The field of the present disclosure further relates to systems and methods for determining the position and movement of multiple items on a conveying system using radio frequency identification (RFID) tags on the items.

Radio frequency identification is the wireless use of electromagnetic fields to transfer data, primarily for the purposes of automatically identifying and tracking tags attached to various objects. The tags contain identifier codes and other electronically stored information that is accessible and readable by an RFID reader. RFID technology is used in a wide variety of fields, such as, for example, in the retail industry for tracking packages and goods during an automated checkout process or in inventory, the medical industry to track medicines and pharmaceuticals, and the manufacturing industry to track progress of parts through assembly lines.

In the retail industry, items may be identified, tracked, and decoded using a variety of systems and methods. For example, items may have RFID tags and/or optical codes (such as barcodes), and various types of systems may be used to transport the items toward a data reading device to capture the target data. In a semi-automatic system, either checker-assisted or self-checkout, objects bearing RFID tags and/or optical codes are moved one at a time by the user into or through the read region of the data reading device, at which the device captures the data from the object. In an automated system (e.g., a tunnel or portal scanner), an object is automatically moved via a transportation or conveying system through the read region, at which the reader automatically captures data from the object when the object passes through the read region.

The present inventors have identified certain disadvantages with conventional checkout systems that use RFID technology to identify and track objects. For example, many checkout systems assume that the conveyor belt speed and trajectory of the RFID-tagged objects are known and constant parameters. On the contrary, the present inventors have identified that these parameters are typically variable in real-life scenarios since the conveyor belt speed may change for any number of reasons and the relative position of the RFID tags may be different from item to item due to the size, shape, and/or placement of the tagged items on the conveyor belt.

In addition, many methods developed for identifying RFID location present several drawbacks. For example, some RFID locating methods rely on very directive antenna and/or antenna arrays, which significantly increases the cost and complexity of the system. As another example, some RFID location processes are based on the intensity of the received signal (RSSI), which indicates the strength of the signal sent from an RFID tag to an RFID reader. RSSI is typically used for estimating the distance between the RFID tag and RFID reader (a stronger signal indicates an item closer to the RFID reader), and identifying movement direction of the item bearing the RFID tag based on the strength of the signal. However, using RSSI alone tends to result in imprecise and inaccurate readings because environmental variables largely affect the strength of the signal from the RFID tag. This issue may be especially problematic in a retail setting because many of the retail items themselves affect RSSI data. For example, items with metallic or other reflecting materials (such as soda cans, canned foods, etc.) may cause signals to bounce uncontrollably, thereby weakening the signal and making the RFID tagged item appear further away from the RFID reader. In addition, liquids (such as milk, water, etc.) may absorb a portion of the signal, or larger items may obstruct the signal from smaller items, thereby causing the signal to appear weaker and resulting in an inaccurate estimation of an item's location.

The present inventors have, therefore, determined that it would be desirable to have a simple and streamlined system with improved performance features for accurately locating RFID tags while taking into account the variable speed of the conveyor system and the changing trajectory of the tagged items. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 8 is a schematic illustrating one embodiment of an object-sorting method for the data reading system of FIGS. 6 and 7.

FIG. 9 is a schematic illustrating another embodiment of an object-sorting method for the data reading system of FIGS. 6 and 7.

DETAILED DESCRIPTION OF DISCLOSED EMBODIMENTS

Figure 1:
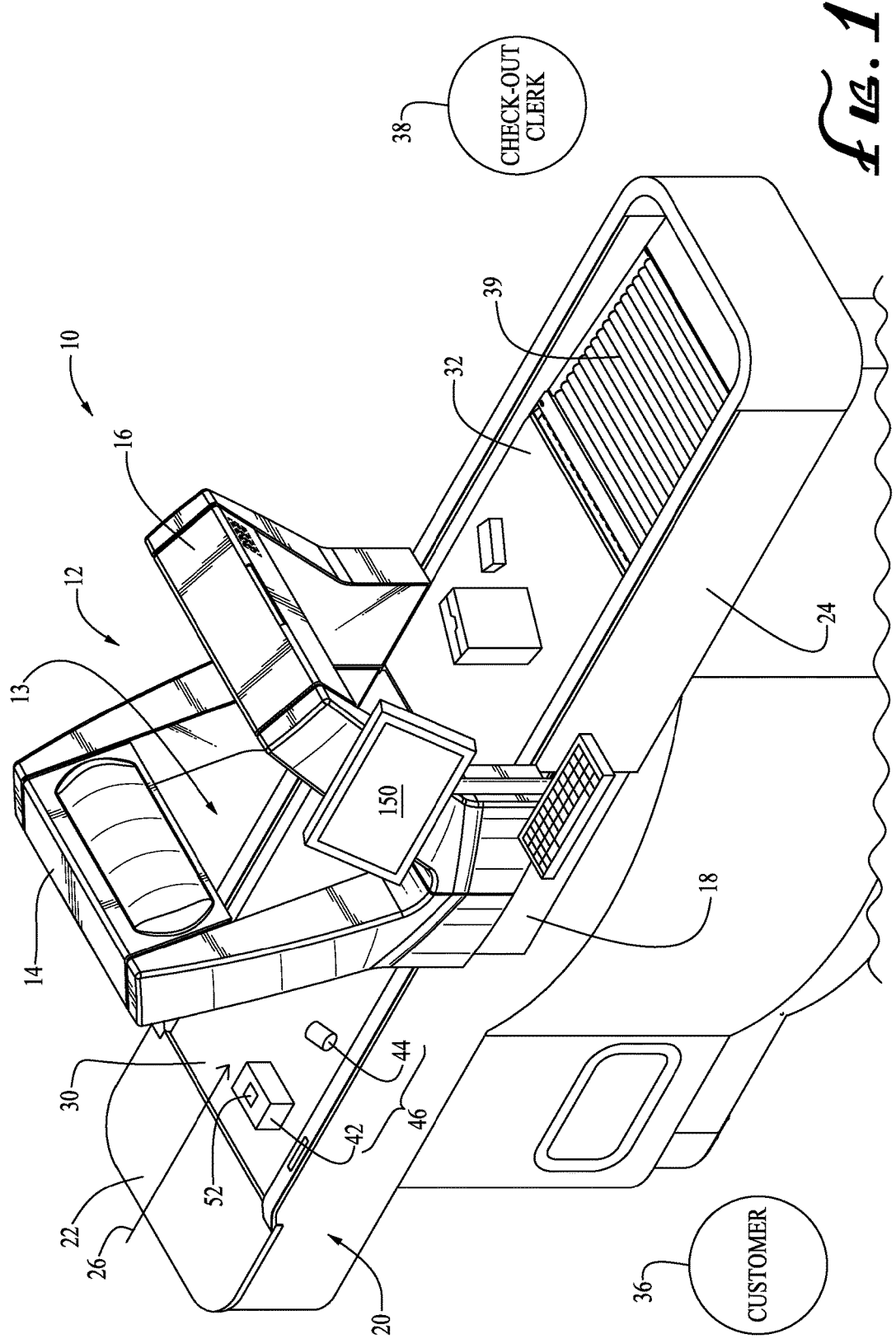
FIG. 1 is an isometric view of an automated data reading system, according to one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein may alternatively be used, for example, in an industrial location such as a parcel distribution center (e.g., postal), warehouse, luggage distribution center, manufacturing assembly lines, or in a retail goods distribution center.

FIGS. 1-10 collectively illustrate embodiments of an automated data reading system 10, 100 and various methods for locating and tracking RFID-tagged items 46, 146 (such as a first item 42 shown as a package/box and/or second item 44 shown as a can). It should be understood that in certain instances, item(s) 46, 146 may refer to a single item or multiple items being transported and processed in the system 10, 100. As is discussed in further detail below, the system 10, 100 may be used to identify and track items 46, 146 during a checkout process in a supermarket or other retail establishment. In some embodiments, the system 10, 100 analyzes the phase of a signal received from the RFID tag 52 (see FIG. 2) carried by or housed in the items 46, 146 over multiple successive readings of the RFID tag 52 to identify and track the items 46, 146 as the items 46, 146 reach a bagging area 39. The system 10, 100 may also sort multiple items 46, 146 present at the same time in a read region 13, 113 during a checkout process to ensure that each item 46, 146 is tracked and captured.

For the purposes of the following description, the progress and reading/tracking may be described with reference to a single item 46, but it should be understood that the system may handle multiple items 46 concurrently transported by the conveyors 30, 32. With particular reference to FIG. 1, in an example operation, a user, which could be either a customer 36 or check-out clerk 38, (collectively/alternately referred to as a "user") places the item 46 onto a leading conveyor section 30 that transports the item 46 in a substantially linear direction of motion 26 toward one or more RFID readers 50. As each item 46 approaches a read region 13 of the RFID reader 50, the RFID reader 50 interrogates one or more RFID tags 52 on the item 46 to read, track, and sort the items 46 during the checkout process. In some embodiments, the scanner unit 12 may also capture various images of the item 46 (including images of a bottom surface of the item 46 captured by a bottom scanner unit 18) and processed to capture other data from the item 46 (such as barcodes for items that may not have RFID tags 52. The images of the item 46 may be presented to the customer 36 (or clerk 38) via a display 150 for review and verification. Once the appropriate data is captured, the item 46 transitions onto a trailing conveyor section 32, which may deposit the item 46 into a bagging area 39 where the item 46 may be placed in a bag for the customer 36. The following sections describe further details of this and other embodiments of the data reading system 10, including additional details relating to locating, tracking, and sorting methods used by the data reading system 10, 100.

With reference to FIG. 1, the data reading system 10, 100 includes a scanner unit 12 installed on a checkout counter 20 in one embodiment. The checkout counter unit 20 includes an inlet end 22 and outlet end 24, and the conveyor sections 30, 32 as described previously. Preferably, the conveyors 30, 32 operate at a constant speed, (e.g., 0.5-3.0 meters/second (m/s)), to optimize the performance of the RFID readers 50, but it should be understood that in many instances, the conveyors 30, 32 operate at a variable speed. Additional details are described below with particular reference to FIGS. 6-9 for handling the variable speed of the conveyors 30, 32 in relation to obtaining accurate readings from the RFID tags 52.

The scanner unit 12 may include data capture devices 14, 16 in the form of inverted U-shaped arches extending over the conveyors 30, 32. Data capture devices 14, 16 may house the RFID readers 50 and other components (such as data readers or imagers) for capturing RFID tags 52 from items 46, and for capturing images (such as top views, side views, etc.) or other information corresponding to the items 46. Further details and example embodiments of a scanner unit 12 are described in U.S. Pat. No. 8,746,564, the disclosure of which is incorporated herein by reference. As mentioned previously, the automated checkout system 10 may include a bottom reader section 18 that reads the bottom side of items 46 as they are passed over the gap 31 between the conveyor sections 30, 32. Additional details and example embodiments of such an automated checkout system are further described in U.S. Patent Application Pub. No. 2012/0187195, the disclosure of which is incorporated herein by reference.

It should be understood that the data reading system 10, 100 includes various modules or subsystems that perform various tasks. These subsystems are described in greater detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The following sections describe example data-reading methods that the data reading system 10, 100 may employ to obtain data from the RFID tags 52 on the items 46 for tracking and sorting the items during the checkout process.

One-Dimensional Data-Reading Scenario

Figure 2:
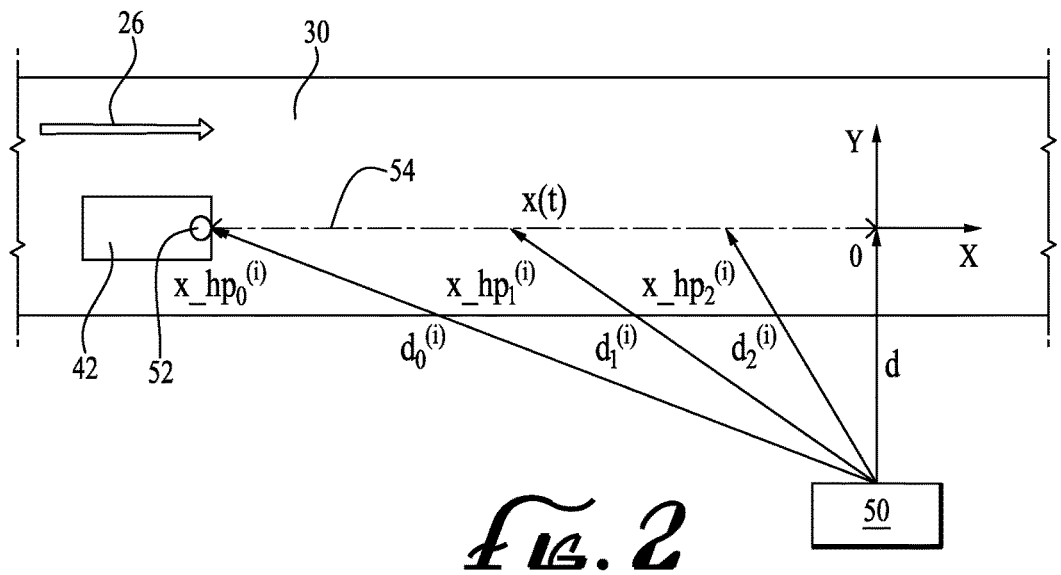
FIG. 2 is a simplified schematic of a data reading system illustrating a one-dimensional (1-D) data-reading scenario, according to one embodiment.

FIG. 2 is a simplified schematic of the data reading system 10 illustrating a one-dimensional (1-D) data-reading scenario, according to one embodiment. The following section discusses calculations and analysis methods performed by the RFID reader 50 (such as by an internal processor thereof or by a computer system 170 in communication with the RFID reader 50 as described in FIG. 7) to track and sort an item 46. FIG. 2 illustrates a one-dimensional (1-D) data-reading scenario where an RFID reader 50 interrogates an RFID tag 52 on the item 46 moving on the conveyor 30. With reference to FIG. 2, in the 1-D data-reading scenario, d is a minimum distance between an antenna of the RFID reader 50 and the RFID tag 52, the point "0" indicates the origin of the axes (i.e., an intersection point between the expected trajectory of the RFID tag 52 and a central axis of the RFID reader 50), and x(t) is the tag distance from the origin of the axes, point "0".

Figure 3:
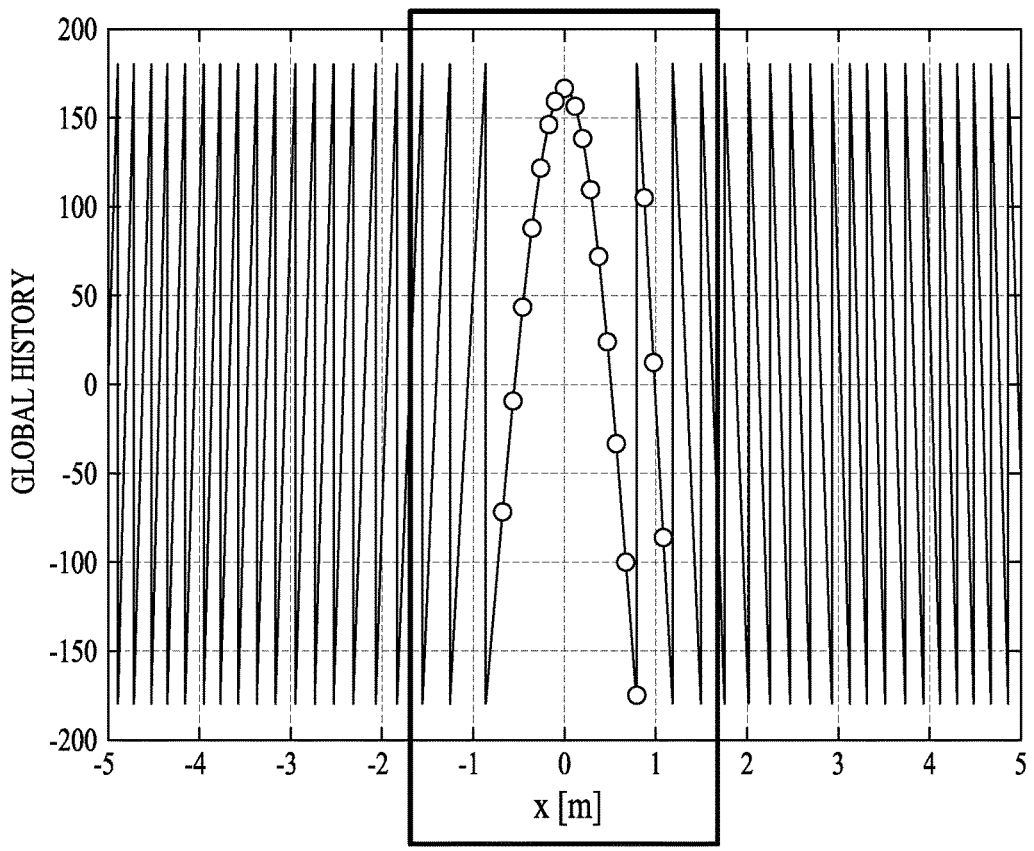
FIG. 3 is a graph illustrating phase history and phase samples as a function of tag position for the data reading system of FIG. 2.
Figure 4A:
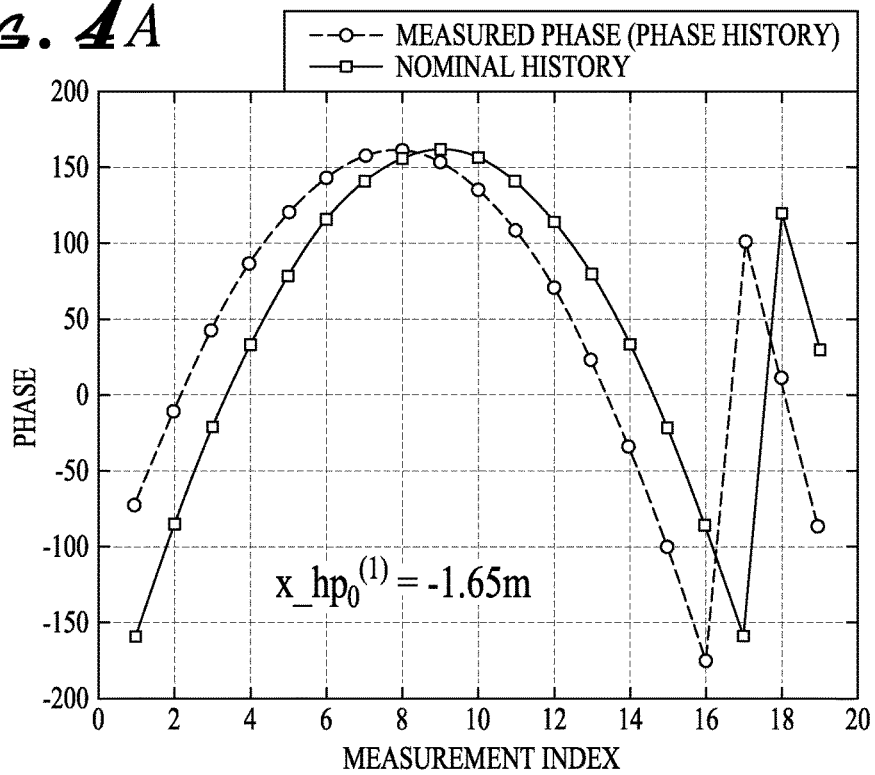
FIGS. 4A, 4B, and 4C are graphs illustrating phase and nominal histories as a function of tag initial position for the data reading system of FIG. 2.
Figure 4B:
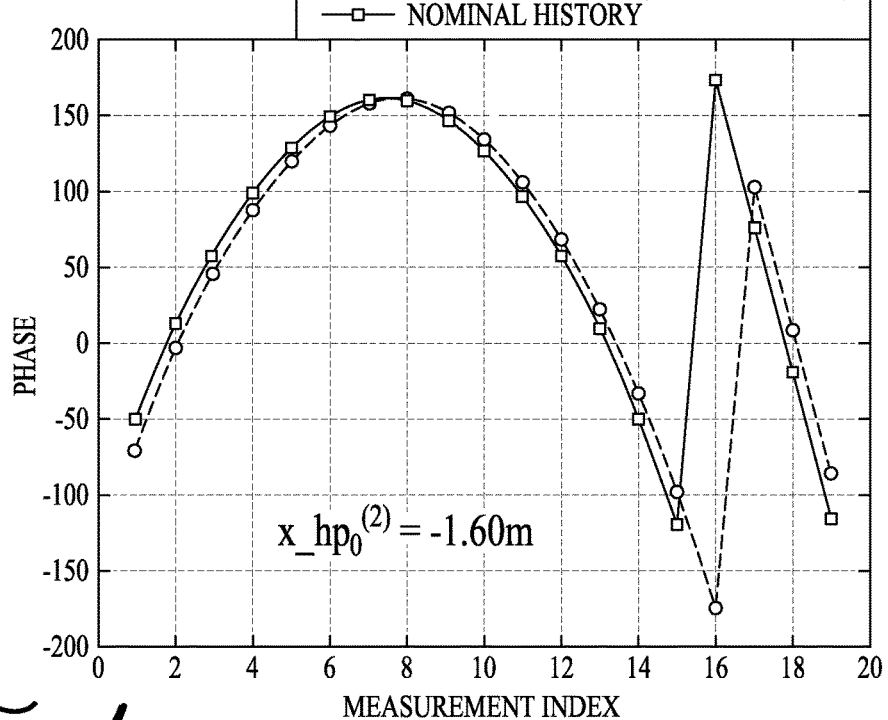
Figure 4C:
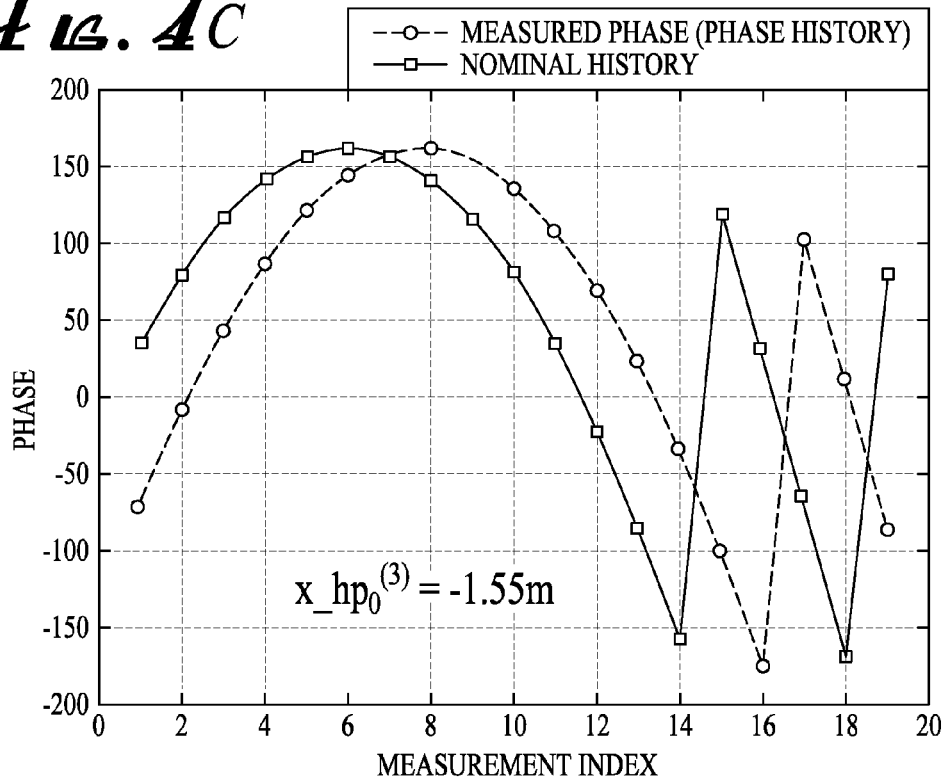

Briefly, the following section discusses phase-distance relation in UHF tag backscattering. For a given RFID reader-tag distance, the phase variation due to the signal propagation can be determined by the following equation:

$$\Delta \varphi = 4\pi f_0 \frac{\sqrt{d^2 + x(t)^2}}{c} \quad (1)$$

where $f_0$ is the carrier frequency (866 MHz) and c indicates the speed of light. By this equation, the variation of the reader-tag distance can be appreciated by measuring the received signal phase. The set of all phase variations assumed by the RFID tag signal when the RFID tag 52 moves along the x-axis 54 is called phase history ($\Delta \varphi$ varies between 0 and $2\pi$). The equation underlines two distinct behaviors as depicted in FIG. 3. When the RFID tag 52 is far away from the RFID reader, that is, when x(t) much greater than d, $\Delta \varphi$ is almost linear with respect to x(t). On the other hand, when the RFID tag 52 approaches the minimum distance d, $\Delta \varphi$ is non-linear. The boxed region in FIG. 3 illustrates an example region where the phase history is non-linear.

With reference to FIGS. 2-5, the following section describes an example algorithm for identifying the position of the RFID tag 52 relative to the RFID reader 50 assuming a one-dimensional reading scenario. After the phase history is collected, a first step is to create a set of hypotheses for the tag position at the first reading $x_{hp}=[x_{(0)}^{(1)}, x_{(0)}^{(2)}, \ldots x_{(0)}^{(m)}]$ and create different phase sets of size $N_k$ (where $N_k$ is the number of tag reader per each tag k) indexed by m. The calculation results in: $x_{hp}=[x_{hp}^{(1)}, x_{hp}^{(2)}, \ldots, x_{hp}^{(m)}]$, where each set $x_{hp}^{(i)}=[x_{hp}^{(i)}(t_1^k), x_{hp}^{(i)}(t_2^k), \ldots x_{hp}^{(i)}(t_{N1}^k)]$ is related to a hypothesis of the tag position at the first reading $x_{(0)}^{(i)}$. These sets define curves called nominal histories that were considered sampled at the same time instants of measurements. It should be noted that the algorithm assumes a possible starting position for the RFID tag 52 when testing the hypothesis (i.e., a tag location at the first reading) comprised in the range $x_{min}$, $x_{max}$, which may also be referred to as a searching area. The spatial resolution of the algorithm $d_s$ determines both the accuracy and the computation complexity. A smaller value $d_s$ indicates a higher accuracy of the tag position estimate, but also a higher number of hypotheses to be tested. Example phase histories and nominal histories obtained for three different tag position at the first reading are depicted in FIGS. 4A, 4B, and 4C.

Figure 5:
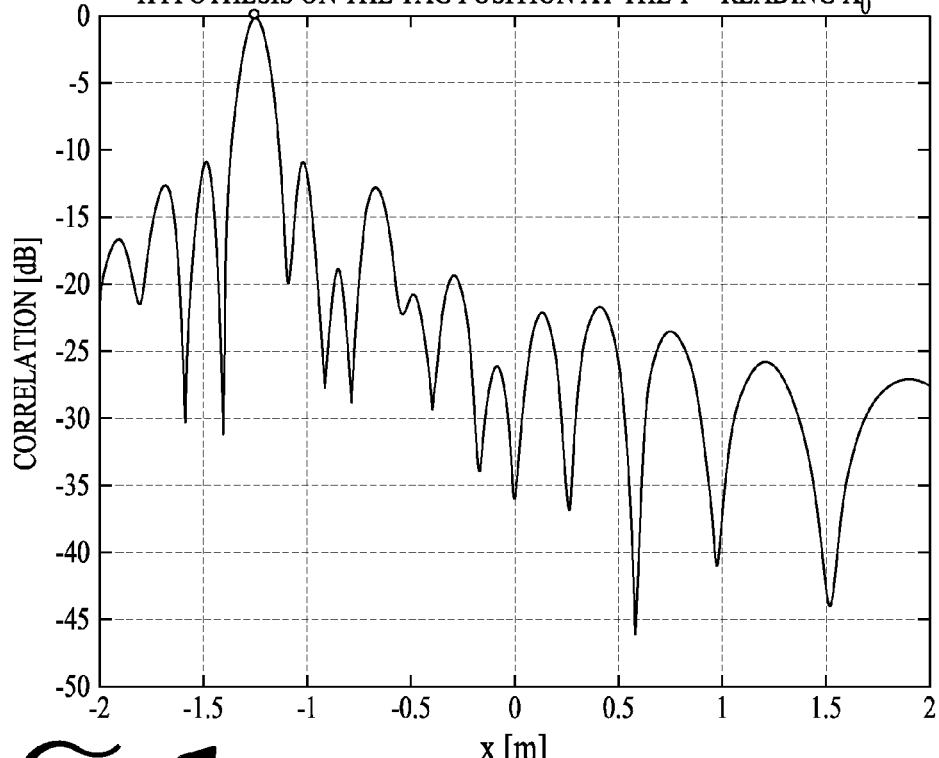
FIG. 5 is a graph illustrating a normalized correlation curve as a function of tag position for the data reading system of FIG. 2.

A second step of the algorithm is to correlate the measured phase history data with all the nominal histories. Specifically, the m-th correlation value $C^{(m)}$ is computed according to the following equation in the complex domain:

$$C^{(m)} = \|[e^{j\varphi_{hp}^{(m)}}] * [e^{j\varphi_{measured}}]\| \quad (2)$$

where $\varphi_{hp}^{(m)}$, is the m-th nominal history and $\varphi_{measured}$ is the phase history. FIG. 5 illustrates an example of the normalized correlation obtained for a single RFID tag 52.

A third step of the algorithm is to select the position $x_0^{(i,k)}$ corresponding to the correlation peak as the most probable position of tag k at the first reading, obtaining the vector $x_0=x_0^{(i,1)}, x_0^{(i,2)}, \ldots x_0^{(i, Nt)}$, where Nt indicates the number of RFID tags 52.

Once the most probable position is selected, a fourth step of the algorithm is to estimate initial positions of all the RFID tags 52 present in the reading zone 13 of the RFID reader 50. Since the RFID reader 50 obtains readings from the RFID tags 52 at different time points, it may be necessary to normalize the estimated initial positions with respect to a universal time instant. In fact, the sorting of items 146 may be incorrect if it was performed using correlation curves that are functions of different time instants for each of the tagged items. Once all the estimated initial positions are normalized, the algorithm may be used to identify and sort the RFID tags 52. Additional details regarding example methods for determining a universal time instant are described in further detail below with regard to FIGS. 8 and 9.

Three-Dimensional Data-Reading Scenario

Figure 6:
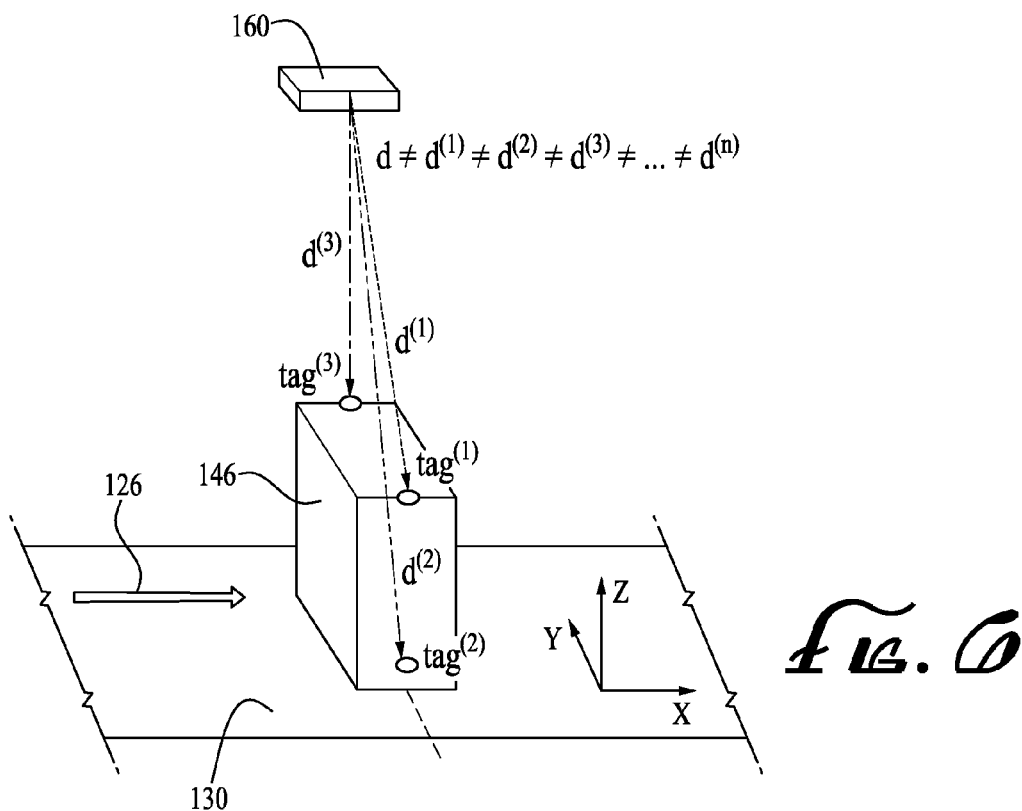
FIGS. 6 and 7 are simplified schematics of a data reading system illustrating a three-dimensional (3-D) data-reading scenario, according to one embodiment.
Figure 7:
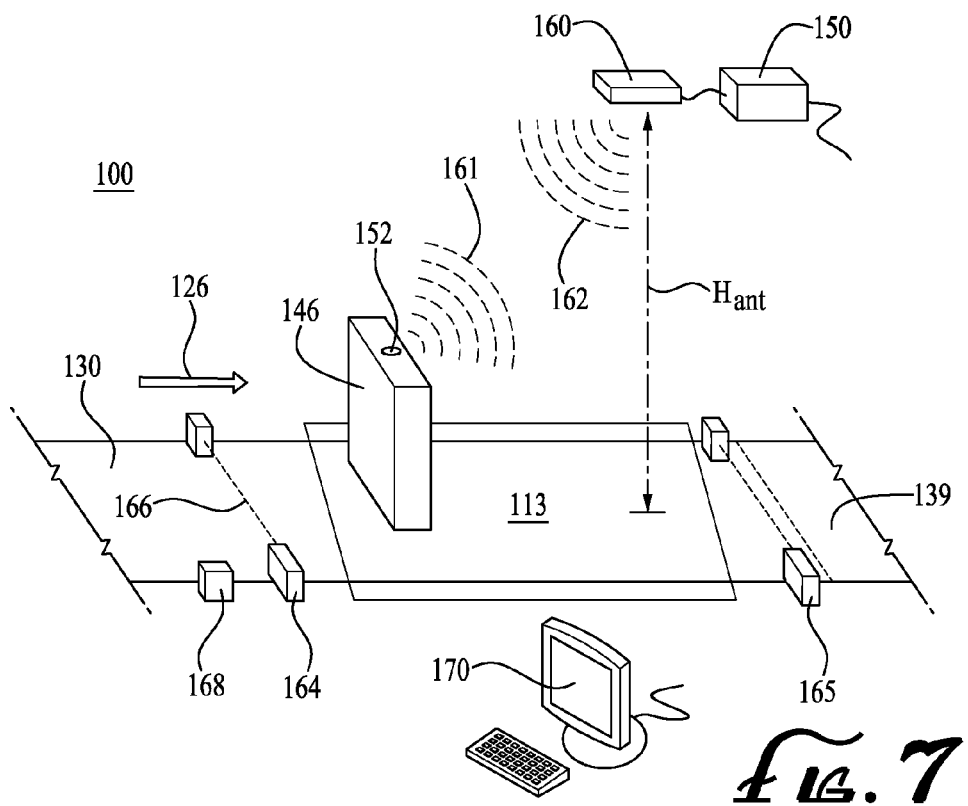

The previous description focuses on sorting and tracking RFID tags 52 in a data reading system 10 where the tagged items 46 are all the same size and shape, and are in relative motion on a conveyor or other transport system moving at a known trajectory and speed, with the foregoing equations and algorithm simplified based on these assumptions. These assumptions, however, may limit applicability of the methods to the scenario described in FIG. 2, where the RFID tags 52 move along the x-axis 54 in a straight line along the conveyor 30 with a constant and known value for d (minimum reader-tag distance). In many applications, however, these parameters (e.g., trajectory, conveyor speed, item location) are not constant. Accordingly, a more complex formula may be needed to account for the variability in these parameters. With particular reference to FIGS. 6 and 7, the following sections describe a process for sorting and tracking RFID tags in an environment where the tagged items may be located at any position on a conveyor that may move at variable speeds.

FIG. 6 is a simplified schematic of a data reading system 100 illustrating a three-dimensional (3-D) data-reading scenario, according to one embodiment. In this scenario, the placement of the RFID tag 152 on the item 146 and/or the speed of the conveyor 130 may vary for each of the items 146. Accordingly, the equations for tracking and sorting the items 146 introduce additional variables to account for these changes. When considering tagged objects 146 of varying size, there is no longer a constant value for the minimum tag-to-antenna distance d, but instead, it is necessary to adopt a matrix $d_{yz}$ to account for a number of possible values for the tag-to-antenna minimum distance. For example, with reference to FIG. 6, the equation for calculating the phase variation due to the signal propagation in a three-dimensional axis can be determined by the following equation:

$$\Delta \varphi_{xyz} = 4\pi f_0 \frac{\sqrt{d_{yz}^2 + d_z^2 + x(t)^2}}{c} \text{ or } \Delta \varphi_{xyz} = 4\pi f_0 \sqrt{\frac{d_{yz}^2 + x(t)^2}{c}} \quad (3)$$

where the vectors $d_y=[d_{y1}, d_{y2}, \ldots d_{yn}]$ of size n and $d_z=[d_{z1}, d_{z2}, \ldots d_{zp}]$ of size p represent the minimum antenna-tag distance along the y-axis and z-axis, respectively. In scenarios where the width of the conveyor 130 is small, then equation (3) may be simplified by approximating $d_y$ to equal 0. Similarly, if all the tags 152 are located at the same height for all items 146 (e.g., the items 146 are the same or substantially similar dimensions and the tags 152 are positioned at the same relative location), then equation (3) may be simplified by approximating $d_z$ to equal 0.

The algorithm for identifying the position of the RFID tag 152 is generally the same as described previously with reference to FIGS. 2-4. However, because of the additional variables and increased complexity, the extension from a simple 1-D scenario to a 3-D scenario requires the creation of M different phase sets of size $N_k$ for each element of the vectors $d_y$ and $d_z$, resulting in a set of n*p*M phase histories that need to be correlated with the phase history for each RFID tag 152. Because of this complexity, the spatial resolution of the algorithm may be chosen to maximize the accuracy of the calculation while minimizing its computational complexity. The spatial sampling spaces for correlation can be different depending on the considered direction, and can be based on the following equation:

$$\Delta x=(x_{max}-x_{min})/M \neq \Delta y=(y_{max}-y_{min})/n \neq \Delta z=(z_{max}-z_{min})/p \qquad (4)$$

Table 1 below illustrates the effect on computational complexity score based on the selection of the spatial sample spaces.

TABLE 1

|  | Range x | Step Δx | Range y | Step Δy | Range z | Step Δz | Complexity |
|---|---|---|---|---|---|---|---|
| Case 1 | −4 m, 0 m | 1 cm | 0 m, 1 m | 2 cm | 0 m, 1 m | 5 cm | 429.471 |
| Case 2 | −2 m, 0 m | 2 cm | 0 m, 1 m | 5 cm | 0 m, 1 m | 10 cm | 23.331 |
| Case 3 | −2 m, −0.5 m | 4 cm | 0 m, 0.5 m | 12 cm | 0 m, 0.9 m | 30 cm | 780 |

As mentioned previously, another factor that may need to be considered is the variable speed of the conveyor 130. The variable speed of the conveyor 130 may be monitored by a position encoder 168 (discussed in more detail with respect with FIG. 7) and iterative computing of the nominal histories. In other words, the series of nominal histories are not obtained by uniformly sampling the theoretical correlation curves (such as those shown in FIG. 5). Rather, each point forming the correlation curve is calculated after a new tag reading is performed, which may mean that the nominal histories consist of non-equally spaced points as a consequence. The current tag position $x\_hp_i = x(t_i)$ associated to the last tag reading is derived starting from the previous position $x\_hp_{i-1} = x(t_{i-1})$ based on following the equation:

$$x\_hp_i^{(m)} = x\_hp_{i-1}^{(m)} + (t_i - t_{i-1})*v_i, \text{ for the } m\text{th hypothesis} \qquad (5)$$

where $t_i$ is the timestamp jointed with the read phase value, and $v_i$ is the speed of the conveyor 130, which can be defined by the following equation:

$$v_i = v(t_i); \text{ or } v_i = v(t_i); \text{ or } v_i = \frac{v(t_i)+v(t_{i-1})}{2} \qquad (6)$$

When the RFID reader 150 (see FIG. 7) and the position encoder 168 are synchronized, formula (5) can be rewritten as follows:

$$x\_hp_i^{(m)} = x\_hp_{i-1}^{(m)} + (s_i - s_{i-1}), \text{ for the } m\text{th hypothesis} \qquad (7)$$

where $s_i = s(t_i)$ defining the spatial movement measured through the position encoder 168.

As noted previously, the simplified equations described with reference to FIGS. 3-5 may be used by the data reading system 10 (see FIG. 2) to track and sort items 46, with the equations assuming various conditions (e.g., constant conveyor speed and fixed tag-to-antenna distance d). FIG. 7 illustrates another embodiment of a data reading system 100 illustrating a three-dimensional (3-D) data-reading scenario, where the system 100 accounts for variations in conveyor speed and tag-to-antenna distance d.

With reference to FIG. 7, the data reading system 100 includes a conveyor 130 that may operate at a constant or variable speed for transporting the RFID-tagged item 146 toward a read region 113 of an RFID reader 150. The RFID reader 150 includes at least one circularly polarized panel RFID antenna 160 for receiving signals 161 from the RFID tag 152, and for transmitting signals 162 preferably in the frequency band ranging from 865-870 MHz. The RFID tag 152 preferably comprises one tag antenna and memory including an identifier code for the item 146. It should be understood that in other embodiments, the frequency band of the RFID antenna 160 may encompass a broader range, such as 860-960 MHz (in compliance with both the European and U.S. standards). Preferably, the RFID antenna 160 is positioned over the conveyor 130 at a suitable height $H_{ant}$ depending on the expected size of the items 146 being processed. For example, for use in a retail environment, the height $H_{ant}$ may be approximately 2 meters (6.5 feet) above the conveyor 130. In other embodiments, the height $H_{ant}$ may range from 1-3 meters (approximately 3-10 feet) above the conveyor 130. Preferably, the antenna 160 is centered with respect the width of the conveyor 130 to help ensure adequate coverage of the read region 113. Preferably, the RFID reader 150 (and/or the RFID antenna 160) is connected to, or is in communication with, a computer or other terminal system 170. The computer 170 may store data received from the RFID tags 152, such as via signals 161, and/or may be used to program features of the RFID reader 150.

In some embodiments, the data reading system 100 may also include one or more presence sensors 164 configured to sense the presence of items 146 on the conveyor 130 as the items 146 pass through a detection field of the presence sensors 164. In one embodiment, the presence sensors 164 may transmit a light beam or light curtain 166 across the conveyor 130 to detect the presence of items 146 on the conveyor 130 and tally a total number of items 146 present on the conveyor 130. The number of items 146 detected by the presence sensors 164 may be used as a comparison tool to ensure that the RFID reader 150 has captured RFID information from each of the items 146 on the conveyor 130 (i.e., the number of items detected by the presence sensor 164 should match the number of RFID tags 152 detected by the RFID reader 150). Preferably, the presence sensors 164 are positioned ahead or before the read region 113 of the RFID reader 150 to monitor the total number of items 146 that should be present in the read region 113.

The data reading system 100 may include a second set of presence sensors 165 adjacent the baggage area 139 (or positioned after the read region 113) to verify that the total number of items 146 entering the read zone 113 match the total number of items 146 exiting the read region 113 and present at the bagging area 139. At any given point in time, the one or more presence sensors 164 track the number of items 146 being processed.

In some embodiments, the system 100 includes a position encoder 168 mounted above or below an actuator system (not shown), such as a belt roller, of the conveyor 130 and operable to monitor the real-time speed of the conveyor 130. In operation, the position encoder 168 may convert movement of the actuator system, e.g., rotation of a conveyor shaft of the belt roller, into square wave output pulses to provide an accurate and reliable means of digitizing position or length of travel of the conveyor 130. The position encoder 168 may be in communication with the RFID reader 150 to provide speed information of the conveyor 130 so that the RFID reader 150 (or other processor unit) may account for the variable speed of the conveyor 130 via equations (5)-(7) to track a position of the items 146.

The following section describes an example operation of the data reading system 100 to track and sort tagged items 146 using the previously described phase-based location algorithm (see FIG. 6). With reference to FIG. 7, a user places the items 146 on the conveyor 130, which transports the items 146 in a substantially linear direction of motion 126 toward a read region 113 of one or more RFID readers 150. As the item is transported on the conveyor 130, the presence sensor 164 detects the item 146 (e.g., the item 146 may interrupt one or more beams of light 166), which may power on or activate a mode of the RFID reader 150 to prepare the data reading system 100 for processing the item 146. Upon activation, the RFID reader 150 continuously interrogates the surrounding environment to identify any RFID tags 152 that may be present. Once tags 152 are identified, the RFID reader 150 obtains the electronic product code (EPC) information or other data encoded on the RFID tags 152 and stores the data in memory and/or communicates the EPC information to the computer terminal 170.

Using the phase-based algorithm described previously, each EPC is assigned a coordinate value formed by both the initial estimated position of the RFID tag 152, and the EPC first reading timestamp. Additional information relating to the EPC first reading timestamp is described below with particular reference to FIG. 8.

From the presence sensor 164, the data reading system 100 receives a tally of the number of items 146 detected by the presence sensors 164 which corresponds to the number of items 146 that are being processed. In addition, via the RFID reader 150, the automated checkout system 100 has a tally of how many EPCs have been identified and localized. Based on this information, the data reading system 100 computes all the estimated positions of the EPCs with respect to a defined universal time instant to find an absolute position of the RFID tagged items 146. Based on the calculated absolute positions, the data reading system 100 may select and associate EPC information and/or other information obtained from the RFID tags 152 with the items 146. As mentioned previously, it may be difficult to reliably track and sort items 146 from the correlation curves unless all the estimated positions of the items 146 are normalized to a universal time instant. The following sections describe two example methods that the data reading system 100 may use to calculate the universal time instant and the absolute position of the items 146.

FIG. 8 is a schematic illustrating one embodiment of a timestamp-based object-sorting method for the data reading system 100 of FIG. 7. In general, the timestamp-based method estimates a time at which each of the items (e.g., items 146a, 146b, and 146c) will cross a threshold line 172 (referred to as a "dead-line" in FIG. 8) on the conveyor 130 based on RFID tag information obtained when the items 146a, 146b, and 146c were located within the reading zone 113. The time to reach the threshold line 172 is calculated based on estimated initial positions of the items 146a, 146b, 146c at a defined timestamp ($Ts_0$). The estimated initial positions of the RFID tags 152 may be obtained using correlation curves (see FIG. 5) and are defined with reference to a position of the antenna 160 (marked as a zero position "0m" in FIG. 8). Based on the estimated initial positions and timestamp ($Ts_0$), the data reading system 100 determines a projected order at which the items 146a, 146b, 146c will cross the threshold line 172 before entering the bagging area 139. Based on the projected order, the data reading system 100 associates the appropriate item 146 with the EPC information obtained from the RFID tags 152. The following section describes further details and illustrates an example of the timestamp-based method with reference to FIG. 8.

With reference to FIG. 8, the timestamp-based method uses the relationship of the tag positions described previously in equation (5). Using the notation in FIG. 8 for convenience, the equation may be rewritten as follows:

$$x\_ref_2 = x\_est + (T_{k(xref2)} - Ts_0) * v_i \quad (8)$$

where $x\_ref_2$ is the distance from the antenna 160 to the threshold line 172; $x\_est$ is the estimated initial position of the RFID tag 152 and the tagged item 146 with reference to the antenna 160; $Ts_0$ is the timestamp associated to the first reading; $v_i$ is the speed of the conveyor 130, which is assumed to be a known and constant value; and $T_{k(xref2)}$ is the time for which each of the RFID tags 152 and the tagged items 146 will pass the threshold line 172. Rewriting equation (8) to calculate $T_{k(xref2)}$, the equation becomes:

$$T_{k(xref2)} = Ts_0 + (x\_ref_2 - x\_est)/v_i \quad (9)$$

Using equation (9), the following describes an example implementation of the sorting method with reference to FIG. 8. First, the algorithm uses a defined reference position. In the example, the defined reference position, $x\_ref_2$, is the threshold line 172. According to FIG. 8, the threshold line 172 is positioned 3 meters from the antenna 160 in this example scenario. Using the timestamp and estimated initial positions (which may be obtained from correlation curves as described previously) noted in FIG. 8 and assuming a constant conveyor speed $v_i$ of 2 m/s, the data reading system 100 may determine at which time $T_{k(xref2)}$ each of the items 146 will cross the threshold line 172. Substituting the values in equation (9), the time $T_{k(xref2)}$ for each item is:

For item 146a: $T_{a(xref2)} = 18.0 \text{ s} + (3 \text{ m} - (-1.5 \text{ m})/2 \text{ m/s} = 20.25 \text{ s}$ \quad (10)

For item 146b: $T_{b(xref2)} = 17.8 \text{ s} + (3 \text{ m} - (-1.6 \text{ m})/2 \text{ m/s} = 20.10 \text{ s}$ \quad (11)

For item 146c: $T_{c(xref2)} = 18.1 \text{ s} + (3 \text{ m} - (-1.7 \text{ m})/2 \text{ m/s} = 20.45 \text{ s}$ \quad (12)

Based on the above calculation, item 146b will be the first to reach the threshold line 172, followed by items 146a and 146c in that order.

As mentioned previously with reference to FIG. 7, when the items 146 are in the read region 113, the RFID reader 150 and antenna 160 interrogate the RFID tag 152 and obtain information relating to the item 146 (such as EPC information). The EPC and other information obtained from the item 146 may be stored in a memory of the RFID reader 152 and/or in a memory of the computer terminal 170 as noted previously. Turning back to the timestamp-based object-sorting illustrated in FIG. 8, the RFID reader 150 may obtain the information, denoted as EPC1, EPC 2, and EPC3 in FIG. 8, from the items 146a, 146b, and 146c, respectively, when the items are in the read region 113. Using the algorithm described above, the RFID reader 150 is able to associate the EPC1, EPC2, and EPC3 information with specific items. For example, since the item 146b, with identifier EPC2, will be the first one to reach the threshold line 172, the data reading system 100 assigns EPC2 to object B and retains EPC1 and EPC3 in memory until those items cross the threshold line 172. Similarly, since the second item to cross the finish line has been determined to be item 146a, the data reading system 100 assigns EPC1 to item 146a when the item 146a crosses the threshold line 172, and so forth for item 146c and any other items. In this fashion, the data reading system 100 is able to track the items 146 through the checkout process and ensure that the items 146 are processed correctly and tracked through to the bagging area 139.

FIG. 9 is a schematic illustrating one embodiment of an encoder-based object-sorting method for the data reading system 100 of FIG. 7. In general, the encoder-based method uses the information collected by both the presence sensor 164 and the position encoder 168 and is capable of tracking both the number of items 146 on the conveyor 130, and the time at which the items 146 will reach the bagging area 139. In general, the encoder-based method tracks items 146 as they approach the threshold line 172 and uses that information, along with the actual speed of the conveyor 130 (obtained via the position encoder 168) to identify and associate captured tag information with each of the items 146. The encoder-based method utilizes some of the same principles as the previously described timestamp-based method. Accordingly, some features and/or components of the encoder-based method may not be described in full detail to avoid repetition. The following section describes further details and illustrates an example of the encoder-based method with reference to FIG. 9.

With reference to FIG. 9, when an item 146 is detected by the presence sensor 168, the current encoder value ($enc_{ref1}$) is stored in a memory of the data reading system 100, such as via the computer terminal 170, and the encoder units (denoted "enc") counter begins counting. As noted previously with reference to the embodiments of FIGS. 6 and 7, the position encoder 164 converts the speed of the conveyor 130 into square wave output pulses, which are referred to here as "encoder units." As the item 146 (and RFID tag 152) travels across the conveyor 130 from the presence sensor 164 to the threshold line 172, the end-value of the encoder units can be characterized by the following equation:

$$enc_{ev} = enc_{ref1} + \Delta n_{enc} \quad (13)$$

where $enc_{ev}$ is the end value of the position encoder 168 when the item 146 reaches the threshold line 172; $enc_{ref1}$ is the encoder value when the item 146 is sensed by the presence sensor 164; $\Delta n_{enc}$ depends only on the speed of the conveyor 130 and the distance between the presence sensor 164 and the threshold line 172.

As is explained in further detail below with reference to equation (14), the estimated position of the RFID tags 152 is determined with respect to the encoder value $enc_{ref1}$ to obtain an absolute position of the RFID tags 152. The absolute position helps maintain a synchronization between the RFID reader 150 and the position encoder 168. The absolute position may be obtained by the following equation:

$$P_{abs} = P_{est} + (enc_{ref1} - enc_{tsi}) \quad (14)$$

where $P_{abs}$ is the absolute position of the item 146; $P_{est}$ is the estimated position; and $enc_{tsi}$ is the encoder value associate to the time instant of the first reading of the i-th tag. In some embodiments, equation (14) may include an additional conversion factor in cases where $P_{abs}$ and $P_{est}$ are measured using different units as the encoder values $enc_{ref1}$ and $enc_{tsi}$, as illustrated in the examples (15)-(17) below.

Using equations (13) and (14), the following describes an example implementation of the sorting method with reference to FIG. 9. In one example, it is assumed that $enc_{ref1} = 10$ enc, where 1 enc=1 cm (this value may be programmed as desired); the presence sensor 164 is positioned 2 meters in front of the antenna 160; and the threshold line is positioned 3 meters after the antenna 160. In this example, the distance from the presence sensor 164 to threshold line 172, or $\Delta n_{enc}$, is 5 meters, or 500 enc. Substituting the values into equation (13) provides $enc_{ev} = 510$ enc. Using the values illustrated in FIG. 9 (which may be obtained using correlation curves), equation (14) yields the following absolute positions for the three items 146:

For item 146a: $P_{abs} = -1.5$ m+(10 enc-100 enc)/100 enc/m=-2.40 m  (15)

For item 146b: $P_{abs} = -1.6$ m+(10 enc-55 enc)/100 enc/m=-2.05 m  (16)

For item 146c: $P_{abs} = -1.5$ m+(10 enc-110 enc)/100 enc/m=-2.70 m  (17)

In this example, when the item "B" approaches the threshold line 172 at the encoder value $enc_{ev}$, the data reading system 100 determines that the RFID tag 152 nearest to the presence sensor 164 at the encoder value $enc_{ref1}$ was the RFID tag 152 for item 146b, which is identified by the EPC2 code (since −2.05 m is approximately equal to −2.0 m, which is the position of the presence sensor 164). Accordingly, the data reading system 100 associates the EPC2 code with the item B. The data reading system 100 may continuously perform this analysis until it has identified and associated RFID tags 152 with each of the respective items 146.

Figure 10:
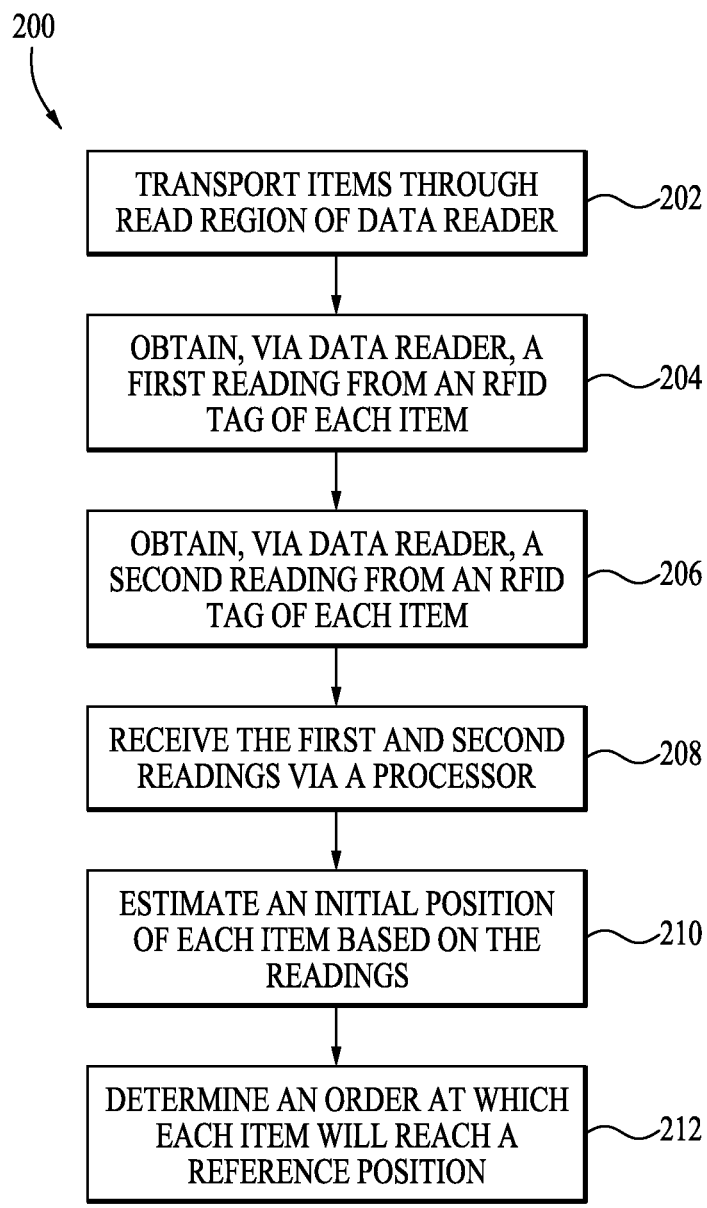
FIG. 10 is a flowchart illustrating an example method of data reading performed by the automated data reading system.

FIG. 10 is a flowchart 200 illustrating an example method of data reading performed by the automated data reading system, comprising the following steps.

Step 202, transporting, via a conveyor system, one or more items through a read region of a data reader.

Step 204, obtaining, via a data reader, a first reading of data at a first time from each tag carried by one or more items as the items pass through the read region. The tag may comprise an electronic tag, such as an RFID tag.

Step 206, obtaining, via the data reader, a second reading of data at a second time from each of one or more tags carried by the one or more items as the items pass through the read region. It should be understood that the data reading steps (e.g., steps 204 and 206) may be repeated numerous times to obtain multiple readings of data at subsequent times to accurately sort the items 146. The number of necessary tag readings ($N_k$) per each tag is unknown a priori since it may depend on several factors, such as: the tag orientation, the conveyor speed (which dictates the tag permanence in the read region), tag transmitting power and reader receiving power (which may be affected by clutter and interferences). Accordingly, the method of data reading may include the additional steps of: obtaining, via the data reader, a third reading of data at a third time from each of one or more tags, and obtaining, via the data reader, a fourth reading of data at a fourth time from each of one or more tags, and so forth to obtain $N_k$ readings.

Step 208, receiving, via a processor, the first reading, the second reading, . . . the $N_k$ readings of data obtained by the data reader. Step 210, estimating, via a processor, an initial position of each of the one or more items based at least on the first and second readings at the first and second times. In some embodiments, the initial position of each of the one or more items may be estimated based on the $N_k$ readings.

Step 212, determining, via the processor, an order at which each of the one or more items reaches a reference position on the conveyor system.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system for tracking a position of tagged items, comprising:
a data reader having a read region;
a conveyor system configured to transport a plurality of items through the read region of the data reader;
a processor in operative communication with the data reader;
wherein, for a first item of the plurality of items, the data reader is configured to: (a) obtain a first item identifier code from a first item tag being passed through the read region, the first item identifier code containing item identification information for identifying the first item to which the first item tag is attached; (b) obtain a first reading of the first item tag at a first time; and (c) obtain a second reading of the first item tag at a second time,
wherein, for a second item of the plurality of items, the data reader is configured to: (a) obtain a second item identifier code from a second item tag being passed through the read region, the second item identifier code containing item identification information for identifying the second item to which the second item tag is attached; (b) obtain a first reading of the second item tag at a first time; and (c) obtain a second reading of the second item tag at a second time, and
wherein the processor is configured to: (a) estimate an initial position of each item tag for the first and second items based at least on the first and second readings for each item, (b) forecast a time and an order at which each of the first and second items will reach a reference position on the conveyor system based on the estimated initial position for each of the first and second items, (c) assign the first item identifier code to the first item to identify the first item based on the forecasted time and order at which the first item will reach the reference position, and (d) assign the second item identifier code to the second item to identify the second item based on the forecasted time and order at which the second item will reach the reference position.

2. The data reading system of claim 1, wherein the data reader is an RFID reader and the item tag is an RFID tag.

3. The data reading system of claim 1, wherein the first and second item tags each further include a tag antenna configured to transmit the respective first and second item identifier codes, and wherein the data reader includes an antenna positioned above the conveyor system and configured to receive the first and second item identifier codes from the tag antenna.

4. The data reading system of claim 1, wherein the processor further uses a correlation curve to estimate the initial position of each of the first and second item tags.

5. The data reading system of claim 1, further comprising a presence sensor configured to sense a presence of each of the plurality of items as the item passes through a detection field of the presence sensor, wherein the presence sensor is in operative communication with the processor, one or both of the presence sensor and processor tallying a total number of items present on the conveyor system.

6. The data reading system of claim 5, wherein the presence sensor is positioned ahead of the read region of the data reader to monitor the total number of items present in the read region.

7. The data reading system of claim 1, further comprising a position encoder coupled to an actuator mechanism of the conveyor system, wherein the position encoder is configured to monitor movement of the actuator mechanism to determine a real-time speed of the conveyor system.

8. The data reading system of claim 7, wherein the position encoder is in operative communication with the processor, the position encoder communicating the real-time speed of the conveyor system to the processor, and wherein the processor forecasts the order at which each item of the plurality of items will reach the reference position based further on the real-time speed of the conveyor system.

9. The data reading system of claim 1, wherein the data reader is further configured to obtain an Nth reading of the first and second item tag for each of the first and second items at a time T, and wherein the processor is further configured to estimate the initial position of each of the first and second item tags based at least on the first, second, and Nth readings.

10. The data reading system of claim 1, further including a single antenna positioned above the conveyor system and configured to obtain multiple successive readings of the first and second item tags as the first and second item tags move along the conveyor system, and wherein the processor is further configured to determine a phase history and a nominal history for each of the first and second item tags based on the multiple successive readings, and wherein the processor estimates the initial position of each item tag for the first and second items based on a correlation between the measured phase history and the nominal history.

11. A method for tracking a position of tagged items, comprising:
transporting, via a conveyor system, a first tagged item and a second tagged item through a read region of a data reader, wherein the first tagged item includes a first item tag including a first item identifier code containing item identification information for identifying the first tagged item, and wherein the second tagged item includes a second item tag including a second item identifier code containing item identification information for identifying the second tagged item;

obtaining, via the data reader, at a first time a first reading of the first item tag and the second item tag being passed through the read region;

obtaining, via the data reader, at a second time a second reading of the first item tag and the second item tag being passed through the read region;

receiving, via a processor, the first and second readings of the first and second item tags obtained by the data reader;

estimating, via the processor, an initial position of each of the first and second item tags based at least on the first and second readings;

forecasting, via the processor, a time and an order at which each of the first and second tagged items will reach a reference position on the conveyor system based on the estimated initial position for each of the first and second items; and assigning the first item identifier code to the first tagged item and the second item identifier code to the second tagged item based on the forecasted time and order at which each of the first and second tagged item will reach the reference position.

12. The method of claim 11, wherein the data reader is an RFID reader and the item tag is an RFID tag.

13. The method of claim 11, wherein the first and second item tags each further include a tag antenna and wherein the data reader includes an antenna positioned above the conveyor system, the method further comprising receiving, via the antenna of the data reader, the first and second item identifier codes from the tag antenna.

14. The method of claim 11, wherein estimating the initial position of each of the first and second item tags further comprises using a correlation curve.

15. The method of claim 11, further comprising:

sensing, via a presence sensor, each of the tagged items as the items pass through a detection field of the presence sensor; and tallying, via one or both of the presence sensor and the processor, a total number of tagged items present on the conveyor system.

16. The method of claim 15, wherein the presence sensor is positioned ahead of the read region of the data reader, wherein tallying the total number of items includes tallying the total number of items present in the read region.

17. The method of claim 11, further comprising determining a real-time speed of the conveyor system via a position encoder coupled to an actuator mechanism of the conveyor system.

18. The method of claim 17, further comprising communicating, via the position encoder, the real-time speed of the conveyor system to the processor, and wherein forecasting the order at which each of the tagged items will reach the reference position is further based on the real-time speed of the conveyor system.

19. The method of claim 11, further comprising:

obtaining, via the data reader, at a time T an Nth reading of the first and second item tag for each of the first and second tagged items being passed through the read region;

receiving, via a processor, the first, second, and Nth readings of data obtained by the data reader; and estimating, via the processor, the initial position of each of the first and second item tags based at least on the first, second, and Nth readings.

20. The method of claim 11, further comprising:

obtaining, via a single antenna positioned above the conveyor system, multiple successive readings of the first and second item tags as the first and second item tags move along the conveyor system, determining, via the processor, a phase history and a nominal history for each of the first and second item tags based on the multiple successive readings, and wherein estimating the initial position of each of the first and second item tags is based on a correlation between the measured phase history and the nominal history.

* * * * *

UNITED STATES PATENT AND TRADEMARK OFFICE
CERTIFICATE OF CORRECTION

PATENT NO. : 9,898,633 B2
APPLICATION NO. : 14/700016
DATED : February 20, 2018
INVENTOR(S) : Marco Bottazzi, Enrico Savioli and Federico Natali It is certified that error appears in the above-identified patent and that said Letters Patent is hereby corrected as shown below:

In the Drawings

Sheet 1, Figure 1, change "reference numeral 150" to --reference numeral 151--.

In the Specification

Column 3
Line 57, change "display 150" to --display 151--.

Column 6
Line 65, change "$\Delta\varphi_{xyz} = 4\pi f_0 \frac{\sqrt{d_{yz}^2 + d_z^2 + x(t)^2}}{c}$ or $\Delta\varphi_{xyz} = 4\pi f_0 \sqrt{\frac{d_{yz}^2 + x(t)^2}{c}}$" to
-- $\Delta\varphi_{xyz} = 4\pi f_0 \frac{\sqrt{d_y^2 + d_z^2 + x(t)^2}}{c}$ or $\Delta\varphi_{xyz} = 4\pi f_0 \frac{\sqrt{d_{yz}^2 + x(t)^2}}{c}$ --.

Column 7
Line 25, change "$\Delta x = (x_{max} - x_{min})M \neq \Delta y = (y_{max} - y_{min})/n \neq \Delta z = (z_{max} - z_{min})/p$" to
-- $\Delta x = (x_{max} - x_{min})/M \neq \Delta y = (y_{max} - y_{min})/n \neq \Delta z = (z_{max} - z_{min})/p$ --.

Column 9
Line 4, change "baggage area 139" to --bagging area 139--.

Column 11
Line 50, change "presence sensor 168" to --presence sensor 164--.
Line 55, change "position encoder 164" to --position encoder 168--.

Signed and Sealed this
Fourteenth Day of August, 2018

Andrei Iancu
*Director of the United States Patent and Trademark Office*

CERTIFICATE OF CORRECTION (continued)
U.S. Pat. No. 9,898,633 B2

In the Claims

Column 14
Line 44, change "tag" to --tags--.

Column 15
Line 24, change "item" to --items--.

Column 16
Line 20, change "tag" to --tags--.
Line 23, change "a" to --the--.